United States Patent [19]
Russek et al.

[11] Patent Number: 5,744,206
[45] Date of Patent: Apr. 28, 1998

[54] BRAIDED SLEEVING WITH RIB STRANDS

[75] Inventors: Jaime Ellstein Russek; Marcelo Mejia Garcia, both of Mexico City, Mexico

[73] Assignee: Vitrica, S.A. de C.V., Mexico City, Mexico

[21] Appl. No.: 746,145

[22] Filed: Nov. 6, 1996

Related U.S. Application Data

[63] Continuation of Ser. No. 475,222, Jun. 7, 1995, abandoned, which is a continuation-in-part of Ser. No. 223,557, Apr. 6, 1994, abandoned, and Ser. No. 285,653, Aug. 3, 1994, abandoned.

[51] Int. Cl.$^6$ .............................. B29D 22/00; B32B 1/08
[52] U.S. Cl. .............................. 428/36.3; 428/377; 87/6; 87/7; 87/8; 87/9; 138/123; 138/124; 138/130
[58] Field of Search .................... 428/36.3, 377; 87/6, 7, 8, 9; 138/123, 124, 130

[56] References Cited

U.S. PATENT DOCUMENTS

| | | |
|---|---|---|
| 2,335,088 | 11/1943 | Shoemaker. |
| 2,393,530 | 1/1946 | Harris. |
| 3,022,802 | 2/1962 | Lewis. |
| 3,079,281 | 2/1963 | Dexter et al.. |
| 3,481,368 | 12/1969 | Vansickle. |
| 3,500,867 | 3/1970 | Elson. |
| 3,522,413 | 8/1970 | Chrow. |
| 3,609,651 | 9/1971 | Sladek. |
| 3,672,704 | 6/1972 | Christianson. |
| 3,744,528 | 7/1973 | Vestal. |
| 3,808,840 | 5/1974 | Blezard et al. ............ 66/87 |
| 3,886,980 | 6/1975 | Elson. |
| 3,891,556 | 6/1975 | Richardson et al.. |

(List continued on next page.)

FOREIGN PATENT DOCUMENTS

| | | |
|---|---|---|
| 5123104 | 9/1980 | Japan. |
| 863837 | 3/1961 | United Kingdom. |
| 1063899 | 4/1967 | United Kingdom. |
| 2 049 485 | 12/1980 | United Kingdom. |

OTHER PUBLICATIONS

Ford Motor Company, Specification No. E9TB–18K459–CA, (Jan. 12, 1987).

Ford Motor Company, Initial Sample Report for Sleeve-Heater Hose Protector No. 478521, (Feb. 27, 1987).

Ratera, Semiautomatic winding machine 4PVL 320. Packaging: Bobbin specifications for fiber glass yarn (Unknown).

Ratera, Braiding machine pitch 208–83L (Unknown).

Techflex, Inc., Bell Helicopter TEXTRON Standard No. 130–053 (Apr. 26, 1989).

Techflex, Inc., FLEXO Bell Helicopter TEXTRON No. 130–053 Confirmation of Specifications (Nov. 27, 1989).

Vitrica, Vitricia Industrial Textile Products (May, 1993).

Paper presented at TECHTEXTIL –Symposium 92 (Lecture 222) entitled "New Developments in the Performance of Textiles," by Dr. C. C. Ou and D. G. Pickering of W.R. Grace & Co., Connecticut, U.S.A.

"Vermiculite Dispersions and Their Benefits as High Temperature Coatings and Binders," by Dr. C. C. Ou and D. G. Pickering, TAPPI Press, Reprinted from 1991 Nonwoven Conference, May 1991.

Material Safety Data Sheet, MSDS No. Z–01261, Aug. 29, 1990 for MicroLite Vermiculite Dispersions HTS–XE, HTS–XE20, HTS–SE.

W.R. Grace & Co. product literature, "MicroLite Vermiculite Dispersion," MD–48 Printed in U.S.A. FA/BFS May 1991 1000 Copyright 1990.

W.R. Grace & Co. product literature, "Uncoated and Micro-Lite Coated Fiberglass Mats Exposed to a Propane Torch at 2000° F." MD–7A Printed in U.S.A. FA/GPS/1000 Copyright 1992.

W.R. Grace & Co. literature Copyright 1990.

*Primary Examiner*—Kathleen Choi
*Attorney, Agent, or Firm*—Fish & Richardson P.C.

[57] ABSTRACT

Braided tubular sleeving with at least two rib strands braided into and around the circumference, optionally encased in a smooth unribbed braid, and in one aspect coated with a vermiculite coating.

27 Claims, 2 Drawing Sheets

U.S. PATENT DOCUMENTS

| | | |
|---|---|---|
| 4,037,083 | 7/1977 | Leavines . |
| 4,229,029 | 10/1980 | Boyer et al. . |
| 4,259,991 | 4/1981 | Kutnyak . |
| 4,276,908 | 7/1981 | Horne ................................ 138/125 |
| 4,420,018 | 12/1983 | Brown, Jr. . |
| 4,433,493 | 2/1984 | Poisson . |
| 4,476,192 | 10/1984 | Imai et al. . |
| 4,576,081 | 3/1986 | Felthuis et al. . |
| 4,602,892 | 7/1986 | Brookstein et al. . |
| 4,684,762 | 8/1987 | Gladfelter . |
| 4,700,171 | 10/1987 | Coffey et al. . |
| 4,701,345 | 10/1987 | Giatras et al. . |
| 4,754,685 | 7/1988 | Kite et al. . |
| 4,775,566 | 10/1988 | Landry et al. . |
| 4,784,886 | 11/1988 | Monget et al. . |
| 4,802,510 | 2/1989 | Berlincourt et al. . |
| 4,836,080 | 6/1989 | Kite et al. . |
| 4,870,887 | 10/1989 | Tresslar et al. . |
| 5,032,199 | 7/1991 | Landry et al. . |
| 5,190,323 | 3/1993 | Oetiker . |
| 5,217,778 | 6/1993 | LaCasse . |
| 5,361,806 | 11/1994 | Lalikos et al. . |
| 5,395,126 | 3/1995 | Tresslar . |

BRAIDED SLEEVING WITH RIB STRANDS

This application is a file wrapper continuation of U.S. application Ser. No. 08/475,222, filed Jun. 7, 1995, now abandoned, which is a continuation-in-part of 08/223,557 filed Apr. 6, 1994, now abandoned, and a continuation-in-part of 08/285,653 filed Aug. 3, 1994, now abandoned.

BACKGROUND OF THE INVENTION

This invention is novel braided tubular sleeving that is useful for thermal insulation of and protection for tubing, hose and wire bundles.

Tubing and hose in automotive and aircraft engines are subject to physical or mechanical damage from vibration and deterioration from the high temperatures in engine compartments. In automobile emission gas re-circulation (EGR) systems that carry hot engine exhaust gases for re-circulation or burning, temperatures get very high. The high temperatures cause the gases to coke the EGR valves. Heat radiating from the tubing can melt rubber and plastic components in the engine compartment. Hot tubing is also a hazard to workers. The use of thermal insulating and abrasion resistant sleeving to cover the tubing provides significant benefits, and suitable sleeving that can provide good thermal insulation to maintain a surface temperature about below 300° F. (150° C.) is very desirable. The sleeving serves also to dampen the vibration of the tubing and thus give additional mechanical protection. Braided sleeving comprised of polymeric materials, glass and metallic filaments are currently used in this service. The sleeving is customarily coated with a lacquer or acrylic resin to protect the fiber, to give color, to provide additional abrasion resistance and to help prevent fraying. Braids of fiberglass yarn tend to fray and deteriorate if not coated. Coatings also enhance the thermal insulation ability by closing the passages that allow heat to pass through the braid. For severe applications, the braid, and therefore the coating, must be able to withstand temperatures of up to about 704° C. (1300° F.) and have a useful life as long as the life of the part it is intended to protect. Many conventional coatings are not suitable for high temperature service. Aluminum powder is often used as a coating. The aluminum powder is usually applied to the braided fabric in admixture with an acrylic resin. Heat volatilizes the acrylic adhesive, leaving a coating of aluminum powder. While satisfactory, the aluminum powder residue does not adhere well to the fabric, and, in time, powders off, leaving the fabric exposed. Such failure of the coating reduces the effectiveness of the braid and speeds deterioration of the sleeving. The increasingly severe service environment and government mandates dictate a continuing need for improved products which provide better and more uniform performance. Some current sleeving has too loose a weave to provide adequate thermal insulation. Some do not retain uniform circumferential shape and do not give uniform insulation or mechanical protection for the covered tubing, hose or wire bundle. Some are not sufficiently rugged for the more demanding environment in which they are to be used.

The present invention is a rugged single and double walled sleeving that provides more uniform thermal insulation and excellent mechanical protection for tubing and hose.

SUMMARY OF THE INVENTION

This invention is a protective sleeving that retains its uniform circumferential shape when longitudinally compressed. It provides superior protection and thermal insulation for tubing, hose and the like in automotive and aircraft engine service. It is tubular sleeving comprising a principal braid of flexible filaments and at least two rib strands, which rib strands are braided into the principal braid in opposite helical directions from each other. It is also double walled sleeving comprising the ribbed sleeving described above encased in unribbed tubular braid. Optionally, the sleeving is coated with a vermiculite coating.

Other advantages and features will be apparent from the following description and from the claims.

DESCRIPTION OF THE PREFERRED EMBODIMENTS

Figure 1:
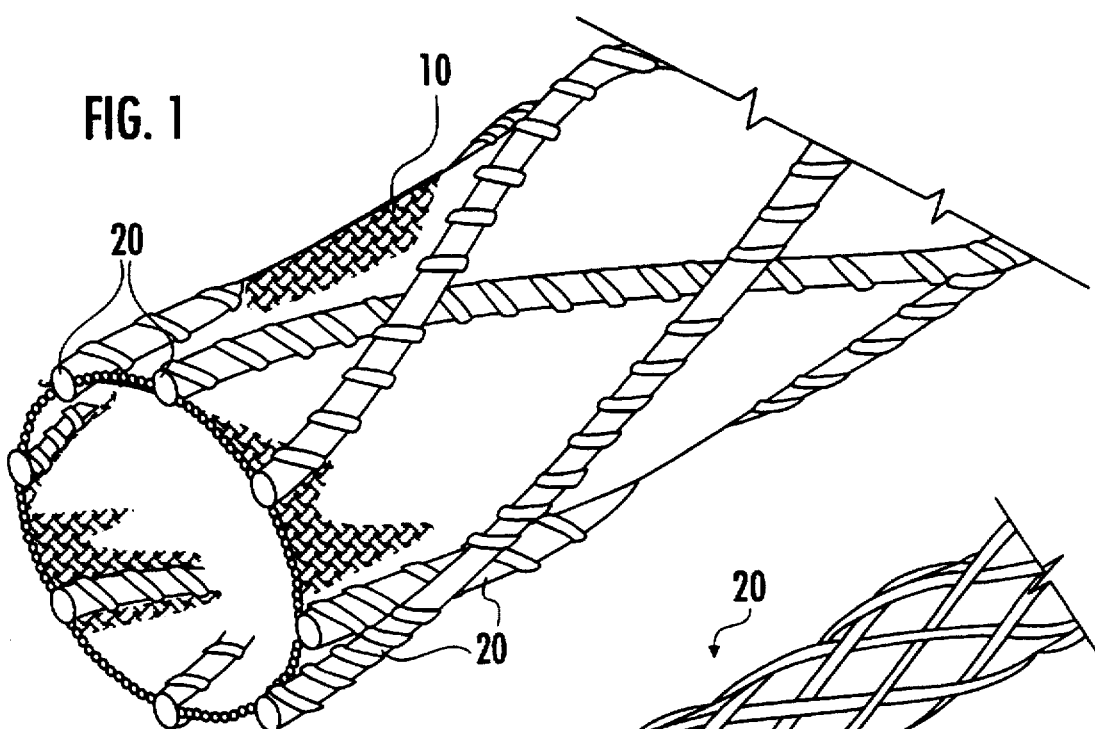
FIG. 1 is a perspective view of braided sleeving.

The braided tubular sleeving of this invention has a principal braid of interlaced flexible filaments with at least two rib strands (ribs) braided into it. The ribs are braided in opposite helical direction from each other. Referring to FIG. 1, the braid (10) consists of strands made by winding on an elongated mandrel in a substantially helical fashion so that the strands are interlaced in an over and under pattern. The sleeving will, in general, have a diameter in the range of about ¼ to 3 inches (0.64 to 7.6 cm) nominal diameter, but it may be of any size.

The flexible filaments of the principal braid are made of suitable polymeric materials such as poly(ethylene terephthalate (or other polyesters), nylons, aramid polymers, and poly(tetra-fluoroethylene) (PTFE) and mixtures. Ceramics, quartz and glass fibers are preferred for higher temperature service, with fiberglass being especially useful. The choice will depend on the application intended for the sleeving.

Figure 2:
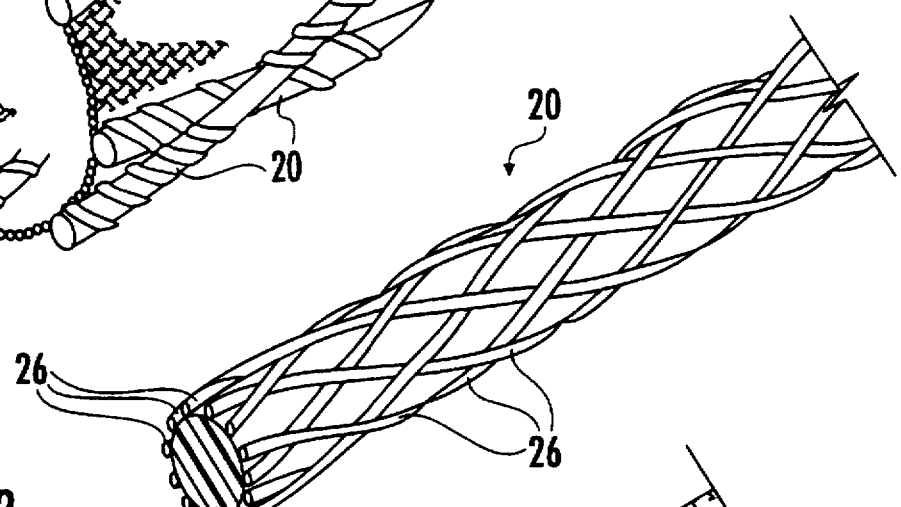
FIG. 2 is a perspective view of a braided rib strand.

The rib strands (20) may be made of the same materials as the principal braid or of metallic filaments such as aluminum, copper, steel, inconel, spring steel, copper-coated steel, piano wire and especially stainless steel. For sleeving used in high temperature abrasive service, it is preferred that at least one filament of the rib strand be stainless steel wire. The metallic wire should be of a relatively small diameter in the range of one (1) to ten (10) mils. The ribs are made in a number of ways. They may be filaments bundled or twisted together. However, it is preferred that they be a braid that is made by braiding filaments, such as wire and/or fiberglass, into a relatively tight circular multi-filament thread as illustrated in FIG. 2. Such braid may be made with or without a center core or soul as exemplified by 24 in FIG. 2. A center core braid is made by interlacing filaments (26) around a core in the center during the braiding operation. A core gives the rib strand form and a more uniform circular rib. The filaments of the rib may be the same material as the flexible filaments of the principal braid or they may be metallic filaments or a combination. These rib strands are generally flexible even when made from or including metallic filaments. In a preferred embodiment, the rib strands (as illustrated in FIG. 2) are made with a core on a twelve carrier braiding machine. The twelve strands are preferably fiberglass or stainless steel or a combination of both. The core is made of several filaments, such as eight (8) ends of fiberglass yarn (such as ETDE 9.0 textured fiberglass yarn available from Owens-Corning Fiberglas Corporation). A fiberglass core is especially preferred. Ribs made entirely of fiberglass filaments may contain twelve strands (each with two (2) to four (4) ends of fiberglass yarn) around a core made of from about two (2) to twelve (12) ends of fiberglass yarn A very good rib is made of twelve strands, each strand having one to six wires, around a core of two to ten ends of fiberglass yarn. The number of ends of yarn in the core determines the diameter of the rib and allows the rib strand to be sized as desired. A suitable wire is 0.0029 inch diameter stainless steel wire available from Willing B. Wire Corporation.

Some prior art sleeving has rigid strands that are wound on a tighter helix from that of the strands of the principal braid. This provides a kind of self-expanding sleeving. Applicants' sleeving is different; the rib strands are relatively flexible and not self-expanding. The flexible rib strands form a kind of cage around the braid. The larger diameter rib strands aid in providing uniform expansion of the circumference when the sleeving is longitudinally compressed and also provide an air space between the sleeve and the tubing it surrounds.

It is preferred that the diameter of the rib strands be larger than that of the strands of the principal braid as illustrated in FIG. 1. These larger rub strands provide a kind of cage around the sleeving that facilitates uniform expansion of the sleeve diameter when the sleeve is longitudinally compressed. It is especially preferred that the diameter of the rib strand be at least fifty percent larger than the principal braid strands. It is especially preferred that the diameter of the ribs be at least twice that of the principal braid. For example, for a 1 inch nominal diameter sleeving, the principal braid is about 1/32 inch (0.8 mm) and the rib strand is 3/32 inch 2.4 mm).

The ribs are braided into the principal braid of the sleeving on a conventional tubular braiding machine (braider). It is customary that about half the braids be woven in one direction and half in the opposite direction. Such braiders include a plurality of carriers (or bobbins) of yarn. The yarn or strands are interlaced under tension. Suitable machines have from about 12 to 144 carriers. Braiding machines with 88 and 96 carriers are common. It is also customary that the braids be positioned in the braid at a diagonal of about 45 degrees, but other configurations can be used. The weave should be such that the sleeving is free to expand by at lease thirty (30) percent. A very tight weave unsuitably restricts the flexibility of the sleeving, and too loose a weave will not provide the required thermal insulation. The ribs may be braided from separate carriers or from carriers with strands of the principal braid strands.

It is necessary that at least two rib strands be woven into and around the circumference of the sleeving in opposite directions from each other. At least six ribs are preferred, and more preferably eight. It is also preferred that they be evenly spaced around the circumference of the sleeving with half in one helical direction and half in the other direction, forming a diamond shaped pattern as shown in FIG. 1. Such a pattern assists in maintaining the uniform tubular shape of the sleeving and facilitates uniform expansion of the sleeve.

The number of rib strands is less than one third (1/3) the number of strands in the principal braid. Thus, in a 96 strand sleeve, the number of ribs will be not more than about 30 to 31. More ribs would make the sleeve excessively heavy and inflexible. Sleeving with about one eighth (1/8) or less ribs strands to principal braid strands are especially suitable. Thus, a sleeve with 96 strands in the principal braid will have 12 or less rib strands. A sleeve of 48 strands in the principal braid will have six or less rib strands. The smaller number of rib strands gives the desired uniform expansion of the sleeve and provides sufficient ribs to hold the sleeve away from contact with the tubing. Excessive rib strands reduce the air space between the sleeve and tubing and therefore reduce the insulating ability of the sleeve.

Figure 3:
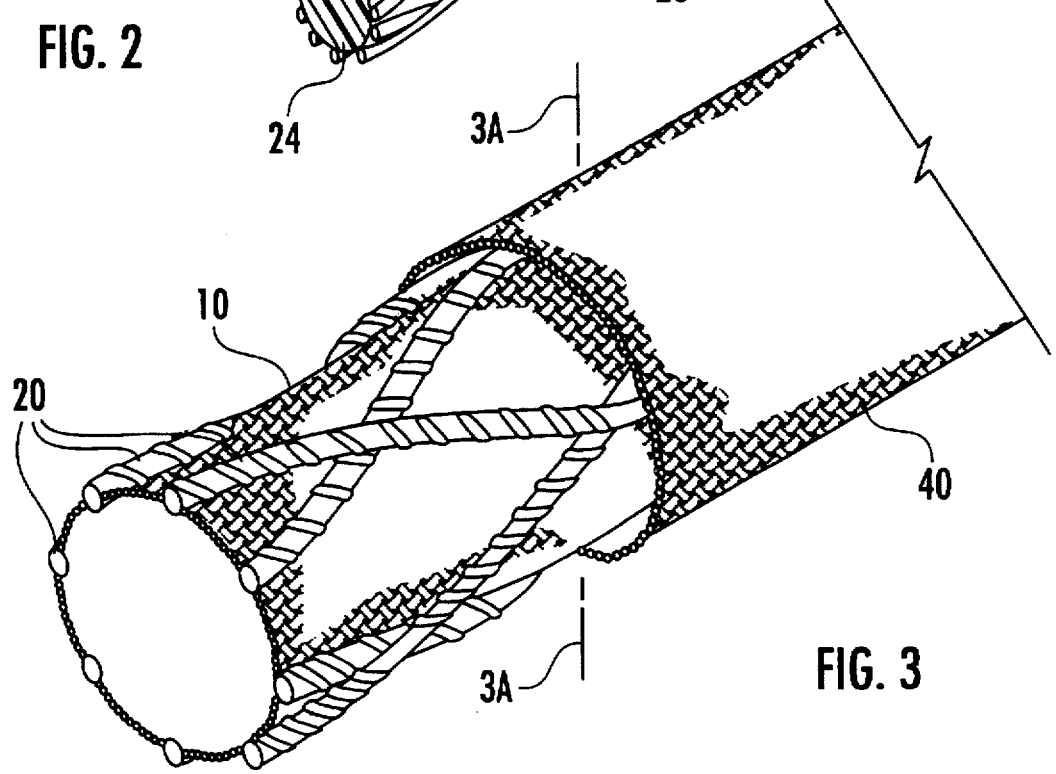
FIG. 3 is a sectional, perspective view of double walled sleeving.
Figure 3A:
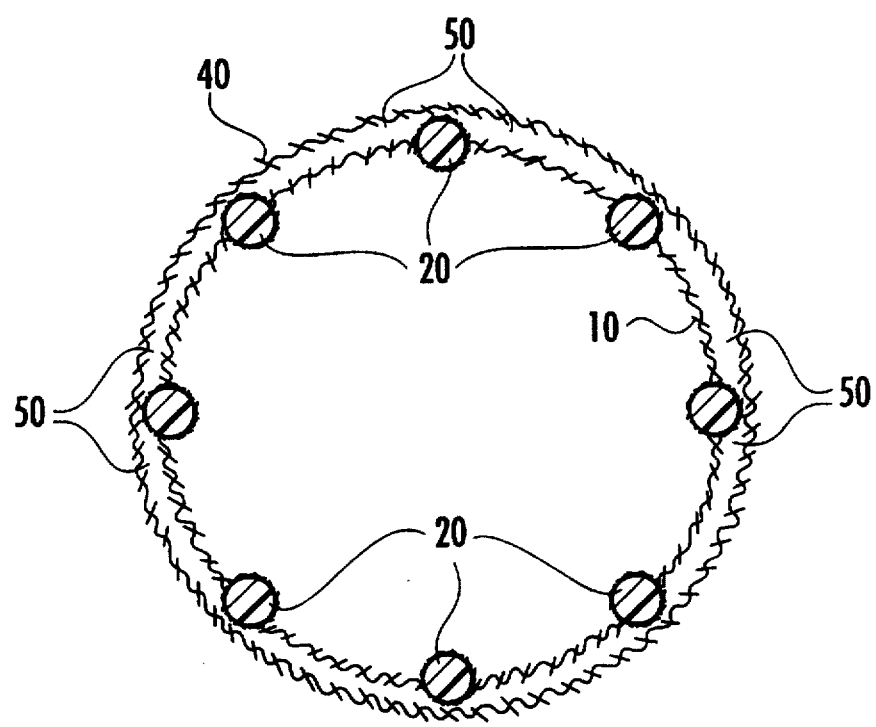
FIG. 3A is a cross-section view of the double walled sleeving of FIG. 3.

As illustrated in FIG. 3, this invention also comprises a first ribbed braided sleeve encased in a second or outer unribbed smooth braid that has no ribs. As illustrated in FIG. 3A, the first or ribbed braided sleeving is sized to conveniently fit inside the second outer sleeve in such a way that the rib strands, but not the surface of the principal braid, contact the inside surface of the second sleeve. This provides an air space (50 in FIG. 3A) that enhances the thermal insulation properties of the double wall sleeving. The second braided sleeve, in which the first sleeve is encased, is formed by braiding strands in the same way as described for the first sleeve except it has no rib strands. The second sleeve is comprised of the same or different materials as the first braid. It may have the same or a different number of braided strands. For example, the first ribbed sleeve may have 96 braids of which two (2) to twelve (12) are rib strands and the second outer sleeve comprises 80 braided strands. In the double walled sleeving, the rib strands of the first sleeve are larger in diameter than the strands of filaments in the principal braid. It is especially preferred that the diameter of the ribs be at least thirty (30) percent larger in diameter than the diameter of the principal braid. For example, a 1 inch nominal diameter sleeve having a braid of about 1/32 inch (0.8 mm) will have ribs of about 3/32 inch (2.4 mm) diameter.

Either or both of the braided sleeves may be coated with a suitable coating to give colors to reduce fraying and to provide additional abrasion and/or thermal protection. The coating can be applied by spraying, dipping or by any other suitable method that gives the desired results. Dip or spray coating the braid as it comes from the braiding machine is usually convenient. Some yarns, especially fiberglass, have an oil/starch coating to provide protection and for ease of handling. It is desirable to remove any such pre-coating to prepare the surface for the braid coating. This can generally be accomplished by heating. For example, the braid is heated by passing it through a gas flame oven and then coated by passing it through a coating bath or spray. The choice of coating composition is determined by costs, convenience and the service use of the sleeving. An acrylic resin coating is useful for sleeving used in relatively low temperature service, such as covering wire bundles. For high temperature service above 300° F. (150° C.), a suitable coating would be an aluminum powder or, preferably, powdered or dispersed vermiculite.

A coating composition that is especially desirable is an aqueous dispersion of vermiculite and optionally an adhesive component, such as lacquer or an acrylic or other polymeric resin. Acrylic resin is preferred.

Vermiculite is a hydrated-magnesium-aluminum silicate formed by geo-chemical alteration of biotite and is a mineral formed in nature in multi-layer crystals. A suitable form available as the trademarked product MicroLite® from W.R. Grace is produced by chemical exfoliation of natural vermiculite. It is miscible in water and available in 80 to 95 percent water dispersions. The dispersions are very stable, have a greenish-brown color and haves no appreciable odor. The vermiculite is in the form of extremely thin platelets which seem to encapsulate glass fiber in woven fabrics. The platelets have a very high aspect ratio (mean diameter/thickness) estimated to be in the range of 2000 or greater and have a negative charge which increases its adhesion to glass. These properties make it an ideal coating for fiberglass filament braids. Moreover, vermiculite is non-toxic and non-hazardous. Unlike some coatings, such as aluminum powder that tends to powder off when the coating adhesive is volatized away, vermiculite coatings remain more firmly adhered to fiberglass braids.

MicroLite® is available in a number of formulations. For example, MicroLite 903® is supplied as a dispersion of 7.5 percent weight solids. MicroLite HTS XE and MicroLite HTE SE are formulated dispersions having about 15 percent solids. Moreover, the HTS grades are formulated with organic and inorganic additives (at concentrations up to a few percent) to give better adhesion and other characteristics. The presence of these additives does not adversely effect the performance of the coating or its ability to adhere to the fibers after severe heating. Based on tests sponsored by W.R. Grace & Co.-Conn., USA [C. Ou, D. G. Pickering; "Vermiculite Dispersions and their Benefits as High Temperature Coatings and Binders", *Proceedings of 1991 Nonwovens Conference*, TAPPI Press. pp. 155–60, (1991)], MicroLite coating on woven fiberglass fabric can increase the service temperature from about 500° C. for uncoated fiberglass to as high as 1100° C. for vermiculite coated fiberglass.

A very suitable coating formulation is a dispersion of vermiculite; preferably aqueous, such as MicroLite HTS XE. Water content is adjusted to control the amount of vermiculite solids take-up on the braid. A vermiculite loading of from about 2 to 20 percent by weight on the braid is preferred; and from about 8 to about 15 percent is especially preferred If too much vermiculite is loaded (deposited) on the braid, it will flake off, resulting in non-uniform and unsatisfactory coating.

The dispersion is placed in a tank or vat that the braid is passed through. Residence time in the bath is not critical, the solids take-up being adjusted by the solids content of the vermiculite dispersion. The nature of the braid, the size of the tank and the speed of passing the braid through the bath are all factors that affect the solids loading of the braid. Therefore, it is not possible to specify these parameters in an absolute way. However, it is very easy to determine the solid content and to adjust it by changing dilution (water content) of the dispersion.

In general, vermiculite solids content of the dispersion is adjusted in the range of from about 5 percent to about 12 percent. MicroLite HTS XE is available as a 15 percent (by weight) dispersion. Dilution to about 50 percent will reduce the solids content to about 7.5 percent. This range of solids content provides great flexibility in the ability to adjust the solids loading on the braid.

Aqueous emulsion acrylic resins are very satisfactory as adhesives. Acrylic resins are thermoplastic polymers or copolymers of acrylic acid, methacrylic acid, esters of these acids or acrylonitrile. Suitable acrylics for use in this invention are commercially available from National Starch Company. Acrylic resin gives body to the braid, and is very suitable for adhering the vermiculite. Moreover, it can be colored as desired The acrylic dispersion may be applied to the vermiculite coated braid in an amount to give a 5 to 20 percent acrylic loading on the finished braid. A loading of 8 to 10 percent is especially desired. Dispersions of acrylic resins are available as 50 percent solid dispersions that can be adjusted by dilution with water to any suitable solids content.

After dipping, the vermiculite coated braid is dried. An acrylic coating may also be applied over the vermiculite and, if so, it will be cured in the same manner as drying the vermiculite coating. Drying and curing can be accomplished at ambient temperatures, but oven drying is faster and more satisfactory. This is conveniently done in a vertical oven in which a coating dip tank is disposed below the oven. Braid is fed into the tank (preferably along a sloped side of the tank) around a pulley attached near the bottom of the tank. The dipped braid is passed upward into the bottom section of the vertical oven by means of another pulley above the top of the oven and to a series of pulleys that provide traction and that guide the braid through its path. The vertical furnace preferably has zones. An inlet zone (or bottom zone) of about 3 to 5 feet is preferably maintained at the lowest temperature, for example about 30° to 80° C., and preferably about 60° C. A top zone, also about 3 to 5 feet in length, will have the highest temperature, about 150° to 200° C., and preferably about 180° C. This temperature profile allows even and complete drying and curing of the acrylic or polymeric coating component. Other temperature profiles can, of course, be used. A 15 foot vertical oven or furnace with the above temperature profile and braid speeds from about 1.5 to 4 feet per minute (preferably about 2 feet per minute) gives excellent results and is easy to operate and maintain. This technique can be used for drying vermiculite coated braid and for curing an acrylic coating applied on top of the vermiculite coating. After drying, as by passing through a vertical furnace, the coated sleeving may be wound on a spool or cut into lengths as desired.

The contents of the coating dip tank, either vermiculite or adhesive, are replenished by makeup material as required to maintain a suitable liquid level in the tank to coat the braid. Dip tanks can be any convenient size; for example, a tank about 4 inches wide and 20 inches long is used effectively. It is large enough to provide room for a pulley and to provide a sufficient reservoir for the coating dispersion. It is desirable that the tank be sloped at one end, for example at about 45 degrees. The tank should be positioned so that the braid enters the tank at the sloped end.

Of course, other suitable means of applying the vermiculite and adhesive coating can be used within the scope and spirit of this invention. For example, the braid can be passed through openings in an otherwise closed tank equipped with nozzles at the top and a receptacle tank at the bottom. The dispersion of the coating formulation is sprayed from nozzles onto the moving braid, the excess accumulated in the bottom receptacle. Liquid from the receptacle is pumped, together with additional makeup liquid, to the nozzles. The braid passes through the spray for sufficient time to provide a suitable coat loading and then to a drying oven.

Figure 4:
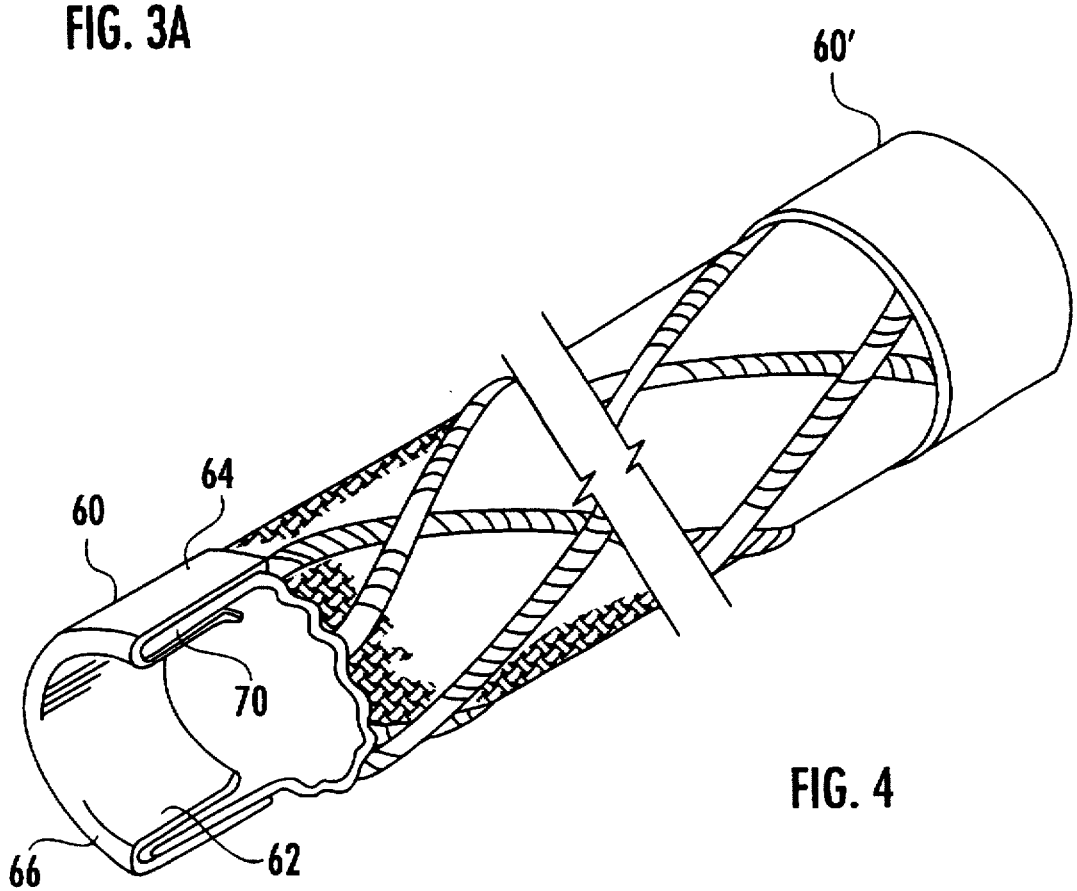
FIG. 4 is a perspective view of sleeving fitted with collars at each end.

An embodiment of the invention comprises sections of single and double walled sleeving of predetermined length (as 12 inches, etc.) with ferrules or collars on at least one end as shown in FIG. 4. The collar functions to assist in longitudinal compression of the sleeving to expand the diameter and to protect the ends from fraying, spreading and unraveling (spraying). Collars may be attached or detachable. For example, a metal collar may be designed to crimp onto the sleeving or it may be constructed to fit on the sleeving in a removable manner such as the collar illustrated in FIG. 3. When longitudinally compressed, the sleeving expands in diameter to provide an enlarged annular space between the sleeving and enclosed tubing, hose or bundle. The resulting annular air space increases the thermal insulating ability of the sleeving. In the double walled embodiments there will be an air space between the walls of the sleeving and between the sleeving and enclosed tubing, providing excellent thermal insulation. Thus, for example, a sleeving section of about 12 inches (30.5 cm) length with a diameter of 0.950 inches (2.4 cm) expands to a diameter of 1.650 inches (4.2 cm) when longitudinally compressed to about 8 inches (20.3 cm). This will enlarge the annular space by (1.650–0.950)/2=0.350 inches or 0.9 cm. One of the advantages of this invention is the relative uniformity of expansion of the diameter. This results from the stiffness and configuration of the rib strands that give more dimensional stability to the sleeving than that in prior art sleeving.

Useful collars or ferrules may be made of any relatively rigid material that can be molded or formed into an appropriate shape and that are usable in the environment (heat, abrasion, vibration, etc.) of use. The choice also depends on the intended use of the sleeving material and the kind of material used in the filaments. For example, sleeves made of fiberglass or fiberglass and steel require a suitably rugged collar, as one made of steel. Engineering polymers such as polyesters, nylons, aramids, polymers and the like are also suitable, particularly for use with sleeving made from like materials. Metals, including aluminum, copper, steel, copper-coated steel and stainless steel, are very suitable. In general, stainless steel is preferred.

Collars may be any design that can be installed around the protected tubing and that engage the end of the sleeving. For example, FIG. 4 depicts a ferrule constructed of two concentric cylinder sections (62 and 64) in which one end (66) of the annular space is closed. The annular space (70) must be sufficient to enclose the end of a braided sleeving, and the inside diameter of the inner cylinder must be sufficient to surround the encased tubing or hose. The inside diameter of the inner cylinder may be approximately the same diameter as the sleeving in its expanded form. Thus, as described above, in a sleeving compressed from twelve (12) inches (30.5 cm) to eight (8) inches (20.3 cm) in use, the inside diameter is about 1.65 inches (4.2 cm). Collar diameters of about 0.5 to 1.5 times the normal diameter of the sleeving are preferred, and 0.8 to 1.5 times is especially preferred. The cylinders are of the same or different lengths but are, in general, relatively short compared with the length of the sleeving section. It is expedient for the top cylinder to be shorter than the inner cylinder to provide easier crimping or other attachment to the sleeving. The collars may be attached by mechanical means or with a suitable adhesive. In a preferred embodiment, a collar having approximately the same diameter as that of the installed compressed sleeving is crimped to the sleeving.

Collars may be a single piece, as described above, or may be designed with two or more pieces that can be assembled together for use. A single-piece design is less costly but can only be used to fit around tubing, hose or bundles that have one end detached (that may be attached after installation of the sleeving). For many applications this will be completely satisfactory. However, for installation on tubing or hose that cannot be conveniently encircled with a one piece collar, it is desirable to have a collar made of two or more pieces that can be attached together. Attachment can be made by fitting a band around the assembled pieces, using adhesives to adhere them together (particularly suitable for non-metallic collars), and attaching the pieces with screws or bolts fitted into suitable fittings. The braided sleeving may be cut into predetermined lengths and equipped with a detached suitably sized collar or ferrule. Such a package or kit of sleeving and collar allows the end user to custom fit the sleeve for use. The kit may also comprise a length of sleeve with a collar attached at one end and a second detached collar to be installed by the end user.

In another aspect, the invention is a process of thermal insulation and protection of tubing from mechanical damage in a high temperature abrasive environment. The process comprises fitting suitably sized tubular sleeving constructed as described above over a tube, hose or wire bundle and longitudinally compressing the sleeving by about one (1) to sixty (60) percent. It is preferred that the length be compressed from about five (5) to fifty (50) percent, and more preferred from ten (10) to forty-five (45) percent. The sleeving can be equipped with a collar as described above that is sized to fit around the protected tubular material. It is preferably sized to the diameter of the longitudinally compressed sleeving. Exemplary of such process is fitting a ¾ inch EGR tube of an automobile engine with one (1) inch nominal diameter sleeving having an attached 1.25 in stainless steel collar at each end. The sleeving is installed around the tubing and compressed. For example, a twelve (12) inch (30.5 cm) sleeve is compressed to about ten (10) inches (25.4 cm) with a corresponding increase in sleeve diameter. This sleeving acts as a thermal insulator and provides protection from mechanical damage. Since the sleeve is a good thermal insulator, its outside surface is much cooler than the surface of the EGR tubing. Thus, a worker who touches the sleeving will not be burned.

Vermiculite coated sleeving as described above is especially desirable in this process.

These representative embodiments are illustrative of the invention, but other modifications and variations are within the scope of the following claims.

What is claimed is:

1. A tubular sleeving, comprising:
   a principal braid of flexible filaments; and
   at least two braided ribs braided into and around the circumference of said principal braid in opposite helical directions, each of said braided ribs including a core around which filaments are braided.

2. The tubular sleeving of claim 1, wherein said core comprises filaments.

3. The tubular sleeving of claim 1, wherein said core comprises fiberglass yarn.

4. The tubular sleeving of claim 1, wherein said core comprises between two and twelve ends of fiberglass yarn.

5. The tubular sleeving of claim 1, wherein the diameter of said braided ribs is greater than the diameter of the flexible filaments of said principal braid.

6. The tubular sleeving of claim 1, wherein said filaments braided around said core are selected from the group consisting of polyesters, nylons, aramid polymers, polytetrafluoroethylene, ceramics, quartz, and glass.

7. The tubular sleeving of claim 1, wherein said ribs comprise twelve filaments braided around said core.

8. The tubular sleeving of claim 1, wherein the ratio of said braided ribs to said flexible filaments is less than about 1:3.

9. The tubular sleeving of claim 1, wherein the ratio of said braided ribs to said flexible filaments is less than about 1:8.

10. The tubular sleeving of claim 1, wherein said principal braid comprises flexible filaments selected from the group consisting of polyesters, nylons, aramid polymers, and polytetrafluoroethylene.

11. The tubular sleeving of claim 1, wherein said braided ribs are oriented at an angle of about 45 degrees relative to a longitudinal axis of said tubular sleeving.

12. The tubular sleeving of claim 1, further comprising:
    a protective coating adhered to a surface of said sleeving.

13. The tubular sleeving of claim 12, wherein said coating comprises an acrylic resin.

14. The tubular sleeving of claim 12, wherein said coating comprises vermiculite.

15. The tubular sleeving of claim 14, wherein the weight of the coated sleeving comprises about 2% to about 20% vermiculite.

16. The tubular sleeving of claim 14, further comprising an acrylic resin coating.

17. The tubular sleeving of claim 16, wherein the weight of the coated sleeving comprises about 5% to about 20% acrylic resin.

18. The tubular sleeving of claim 1, further comprising:
    a secondary braid of flexible filaments, said secondary braid encasing said principal braid.

19. The tubular sleeving of claim 18, wherein said secondary braid is separated from said principal braid by said braided ribs.

20. The tubular sleeving of claim 18, wherein the diameter of said braided ribs is at least about 30% greater than the diameter of said principal braid.

21. The tubular sleeving of claim 1 that is coated with vermiculite from a dispersion of vermiculite particles, the coating in an amount in the range of about 2 to 20 percent by weight of the sleeve.

22. The tubular sleeving of claim 21 in which the vermiculite coating is further coated with an acrylic adhesive in an amount in the range of about 6 to 10 percent weight adhesive based on sleeve weight.

23. The tubular sleeving of claim 21 in which the vermiculite coating is applied by moving the sleeving through an aqueous dispersion of vermiculite under conditions of dispersion concentration and moving speed sufficient to obtain a solids content of vermiculite in the range of 2 to 20 percent by weight of the sleeving, an acrylic content on the range of 5 to 20 percent by weight of the sleeving, and drying the sleeving in a vertical heated furnace by passing the sleeving through the furnace at a rate in the range of 1.5 to 4 feet per minute, the furnace being maintained with a temperature profile ranging from about 60° C. at the braid inlet to about 180° C. at the braid outlet.

24. The tubular sleeving of claim 23 in which the vermiculite coated sleeving is further coated with an adhesive resin.

25. The tubular sleeving of claim 18 in which the first braid is coated with vermiculite from a dispersion of chemically exfoliated vermiculite in an amount in the range of about 2 to 20 percent by weight of the sleeve.

26. The tubular sleeving of claim 18 in which both braids are coated with vermiculite from a dispersion of chemically exfoliated vermiculite in an amount in the range of about 2 to 20 percent by weight of the sleeve.

27. The tubular sleeving of claim 21 in which the rib strands comprise less that ⅓ of the total number of rib strands and principal braid strands in the braid.

* * * * *